(12) United States Patent
Wienkes

(10) Patent No.: US 12,112,648 B2
(45) Date of Patent: Oct. 8, 2024

(54) DETERMINING VEHICLE OPERATING STATE BY PARTICLE DETECTION

(71) Applicant: Honeywell International Inc., Charlotte, NC (US)

(72) Inventor: Lee R. Wienkes, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 697 days.

(21) Appl. No.: 17/184,142

(22) Filed: Feb. 24, 2021

(65) Prior Publication Data

US 2022/0270498 A1      Aug. 25, 2022

(51) Int. Cl.
*G08G 5/00* (2006.01)
*B64D 43/00* (2006.01)
(Continued)

(52) U.S. Cl.
CPC .......... *G08G 5/0091* (2013.01); *B64D 43/00* (2013.01); *G01N 15/0205* (2013.01);
(Continued)

(58) Field of Classification Search
CPC .... B65D 43/00; B65D 15/0205; B65D 15/14; B65D 2015/0238; B65D 2015/1486;
(Continued)

(56) References Cited

U.S. PATENT DOCUMENTS

| | | |
|---|---|---|
| 6,894,768 B2 | 5/2005 | Caldwell et al. |
| 7,656,526 B1 | 2/2010 | Spuler et al. |

(Continued)

FOREIGN PATENT DOCUMENTS

| | | |
|---|---|---|
| EP | 3290674 A1 | 3/2018 |
| EP | 3301456 A1 | 4/2018 |
| EP | 3339184 A1 | 6/2018 |

OTHER PUBLICATIONS

"Laser Doppler Velocimetry", Obtained from Wikipedia Sep. 5, 2023.*

(Continued)

*Primary Examiner* — Jason Holloway
*Assistant Examiner* — Blake A Wood
(74) *Attorney, Agent, or Firm* — Fogg & Powers LLC

(57) ABSTRACT

A system for determining a vehicle operating state is provided. The system includes at least two particle detectors, a controller and a memory. A sample volume used by each particle detector of the at least two particle detectors configured to be collected in a different location relative to the vehicle than another sample volume used by another particle detector of the at least two particle detectors and at least one sample volume is configured to be collected in an environment where particles are disturbed by the vehicle. The controller is configured to determine at least one operating state of the vehicle based at least in part on a comparison of output signals of the at least two particle detectors. The at least one memory is used to store at least operating instructions implemented by the controller in determining the at least one operating state of the vehicle.

20 Claims, 6 Drawing Sheets

(51) Int. Cl.
    *G01N 15/0205*     (2024.01)
    *G01N 15/14*     (2024.01)

(52) U.S. Cl.
    CPC ..... *G01N 15/14* (2013.01); *G01N 2015/0238* (2013.01); *G01N 2015/1486* (2013.01)

(58) Field of Classification Search
    CPC . G01P 5/20; G01P 5/26; G01P 13/025; G08G 5/0091
    See application file for complete search history.

(56) References Cited

U.S. PATENT DOCUMENTS

| | | | |
|---|---|---|---|
| 8,749,794 | B2 | 6/2014 | Lehureau et al. |
| 10,518,896 | B2* | 12/2019 | Garde ................. G01P 5/26 |
| 10,672,282 | B2 | 6/2020 | Garde |
| 2010/0128251 | A1* | 5/2010 | Perrie ................ G01P 13/025 |
| | | | 356/28.5 |
| 2010/0195089 | A1* | 8/2010 | Wu .......................... G01P 5/20 |
| | | | 356/28.5 |
| 2011/0128524 | A1 | 6/2011 | Vert et al. |
| 2012/0089362 | A1* | 4/2012 | Mandle ................ G01P 13/025 |
| | | | 702/144 |
| 2014/0136142 | A1 | 5/2014 | Rolt et al. |
| 2017/0248700 | A1* | 8/2017 | Lodden ................. G01P 21/025 |
| 2018/0088239 | A1* | 3/2018 | Garde ....................... G01P 5/26 |
| 2019/0302141 | A1 | 10/2019 | Caldwell et al. |
| 2019/0324051 | A1 | 10/2019 | Wienkes et al. |

OTHER PUBLICATIONS

European Patent Office, "Extended European Search Report from EP Application No. 22155372.0", from Foreign Counterpart to U.S. Appl. No. 17/184,142, Jul. 26, 2022, pp. 1 through 7, Published: EP.

* cited by examiner

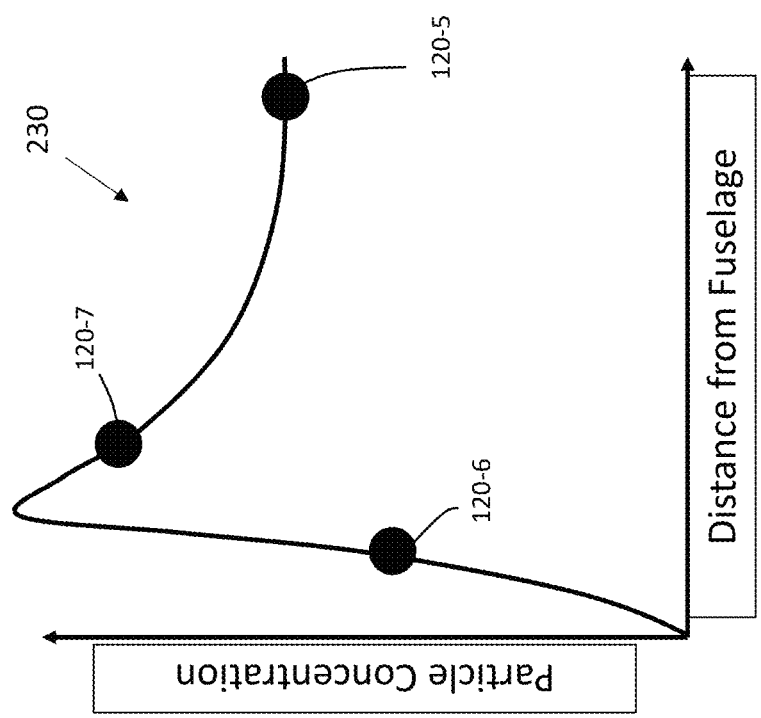

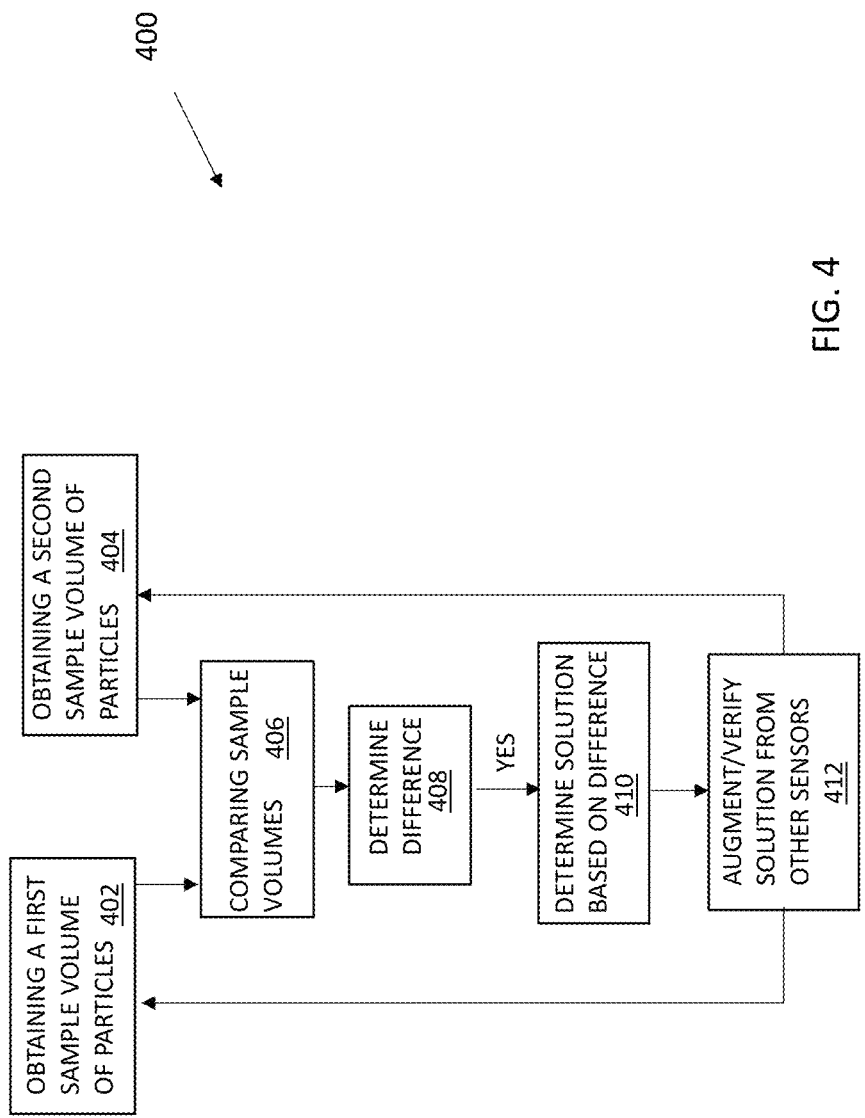

DETERMINING VEHICLE OPERATING STATE BY PARTICLE DETECTION

BACKGROUND

Detecting particulates in fluids typically utilizes a light source to illuminate particles, a collection of optics to receive scattered light from the particles and a detector to convert the collected light into an electrical particle signals that can be processed, digitized, etc. The particle signals can be used to derive information regarding particles in a sample volume such as particle size and concentration. The particle signals may also allow for the calculation of other parameters which may be of interest in determining vehicle operating states in an environment. For aerospace applications, deriving air data parameters for use as a backup system or in data fusion with a traditional air data probe may be of particular interest.

SUMMARY

The following summary is made by way of example and not by way of limitation. It is merely provided to aid the reader in understanding some of the aspects of the subject matter described. Embodiments provide a vehicle operating state particle detection system that determines an operating state of vehicle by comparing particle information in sample volumes collected by particle detectors.

In one embodiment, system for determining a vehicle operating state is provided. The system includes at least two particle detectors, a controller and a memory. A sample volume used by each particle detector of the at least two particle detectors is configured to be collected in a different location relative to the vehicle than another sample volume used by another particle detector of the at least two particle detectors. Wherein at least one sample volume is configured to be collected in an environment where particles being detected by an associated particle detector are disturbed by the vehicle when the vehicle is in motion. The controller is in communication with the at least two particle detectors. The controller is configured to determine at least one operating state of the vehicle based at least in part on a comparison of output signals of the at least two particle detectors. The at least one memory is used to store at least operating instructions implemented by the controller in determining the at least one operating state of the vehicle.

In another example embodiment, system for determining a vehicle operating state is provided. The system includes a plurality of particle detectors, at least one controller, and at least one memory. A sample volume used by one of the particle detectors of the plurality of particle detectors is collected at a distance from a surface of the vehicle that is greater than at least one other collected sampled volume used by another particle detector of the plurality of particle detectors. The at least one controller is in communication with the plurality of particle detectors. The controller is configured to determine at least one operating state of the vehicle based at least in part on a comparison of output signals of at least two particle detectors of the plurality of particle detectors. The at least one memory is used to store at least operating instructions implemented by the controller in determining the at least one operating state of the vehicle.

In yet another embodiment, a method of operating a system for determining an operating state using particle detection is provided. The method includes obtaining at least a first sample volume of particles and a second sample volume of particles, wherein the first sample volume is collected in an environment where particles being detected by a particle detector are disturbed by the vehicle by a change in operating state of the vehicle and the second sample volume is collected in an environment where the particles in the second sample volume being detected will be disturbed in a different manner than the particles in the first sample volume by the change in operating state of the vehicle; comparing particles in the at least first sample volume and the second sampled volume; and determining at least one operating state of the vehicle based on the comparison.

BRIEF DESCRIPTION OF THE DRAWINGS

Embodiments can be more easily understood and further advantages and uses thereof will be more readily apparent, when considered in view of the detailed description and the following figures in which:

FIG. 2C illustrates a particle concentration verses distance from fuselage graph according to one exemplary embodiment;

FIG. 4 illustrates system for determining a vehicle operating state flow diagram according to one exemplary embodiment.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide system for determining a vehicle operating state that can be used to determine a then current operating state of the vehicle. An operating state of a vehicle defines how the vehicle is behaving or interacting in an environment. A determined operating state may be used as a backup and/or augment determined operating state provided by vehicle sensors such as, but not limited to, air data sensor systems in an avionic application. Because a particle detector vehicle operating state determining system has different failure modes than air data sensor system of an aircraft its application as a backup is very beneficial. For example, the more particles measured, the more accurate an estimate of air data parameters. Further environments with high particulate counts are also potential icing environments, where traditional air data probes fail. The air data parameters derived from the particulate sensor may also be used to hint at navigation solutions or otherwise bound navigation solutions provided by air data systems, making the solutions more accurate and robust or to cross check for inconsistencies with the existing air data parameters.

Figure 1:
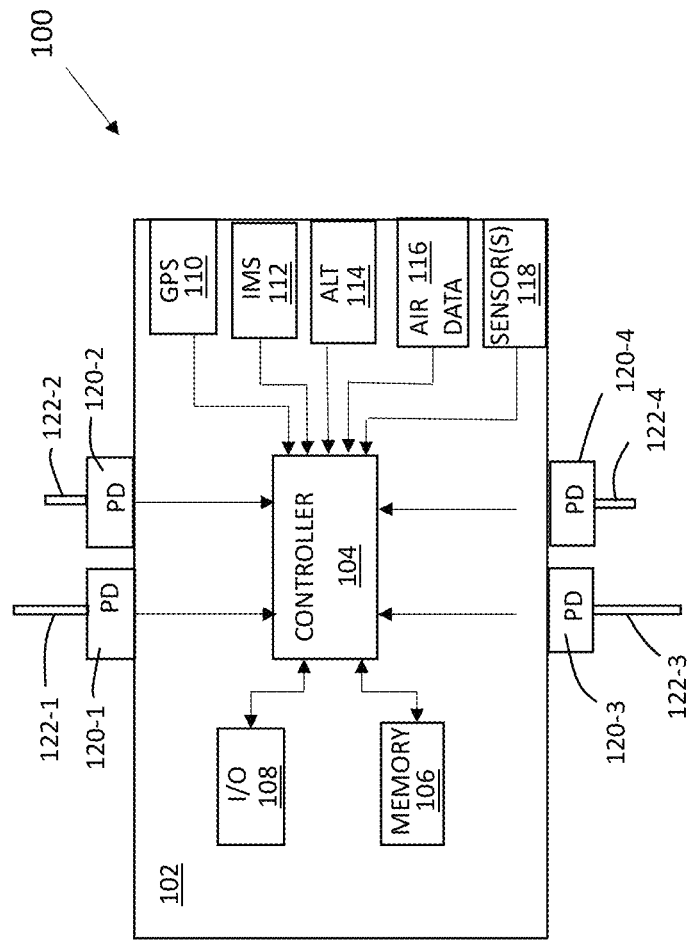
FIG. 1 illustrates a block diagram of a system for determining the vehicle operating state using particle detection according to one exemplary embodiment.

Referring to FIG. 1, a block diagram of a system 100 for determining an operating state using particle detection of an example of an embodiment is illustrated. In particular, FIG. 1 illustrates a vehicle 102 that includes the system 100 for determining an operating state using particle detection. The system 100 includes at least one controller 104 and at least one memory 106. In general, the controller 104 may include any one or more of a processor, microprocessor, a digital signal processor (DSP), an application specific integrated circuit (ASIC), a field program gate array (FPGA), or equivalent discrete or integrated logic circuitry. In some example embodiments, controller 104 may include multiple components, such as any combination of one or more microprocessors, one or more controllers, one or more DSPs, one or more ASICs, one or more FPGAs, as well as other discrete or integrated logic circuitry. The functions attributed to the controller 104 herein may be embodied as software, firmware, hardware or any combination thereof. The controller 104 may be part of a system controller or a component controller. The memory 106 may include computer-readable operating instructions that, when executed by the controller 104 provides functions of the system 100 for determining an operating state using particle detection. Such functions may include the functions of determining a then current operational state of the vehicle as described below. The computer readable instructions may be encoded within the memory 106. Memory 106 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The system 100 for determining an operating state using particle detection in this example includes a plurality of sensors, 110 through 120-4, that provide information to the controller in determining a current vehicle operating state. The sensors in this example includes a global position system (GPS) 110 to provide location information, an inertial measurement system (IMS) 112 to provide at least directional acceleration information and an altitude sensor 114 to provide altitude information. The sensors further may include air data sensors 116 to provide air data measurements that may include temperature and air speed information. The air data sensors may be, but are not limited to, mechanical vanes and pitot-static systems. Other types of sensors 118 may also be used that provide vehicle operating state information such as LiDAR echo measurement sensors. Information from these sensors alone or in combination are used by the controller 104 in determining a current operational state of the vehicle. Also included with the vehicle 102 may be an input/output 108 that may provide a user an input for at least the operating instructions stored in the memory 106 and a system output that outputs controller determinations. Further the input/output 108 may include a vehicle operating control system configured to use, at least in part, determinations of a vehicle operating state from the controller 104.

The system 100 for determining an operating state using particle detection further includes particle detectors 120-1 through 120-4 which, as described below, may augment operational state determinations by using a system with dissimilar failure modes or to cross check for inconsistencies etc. Each particle detectors 120-1, 120-2, 120-3 and 120-4 is associated with a focal length 122-1, 122-2, 122-3 and 122-4 of receive optics of its associated particle detector 120 120-1, 120-2, 120-3 and 120-4. The particle sensors may generally be referenced by 120 and the associated focal length may generally be referenced by 122.

Figure 2A:
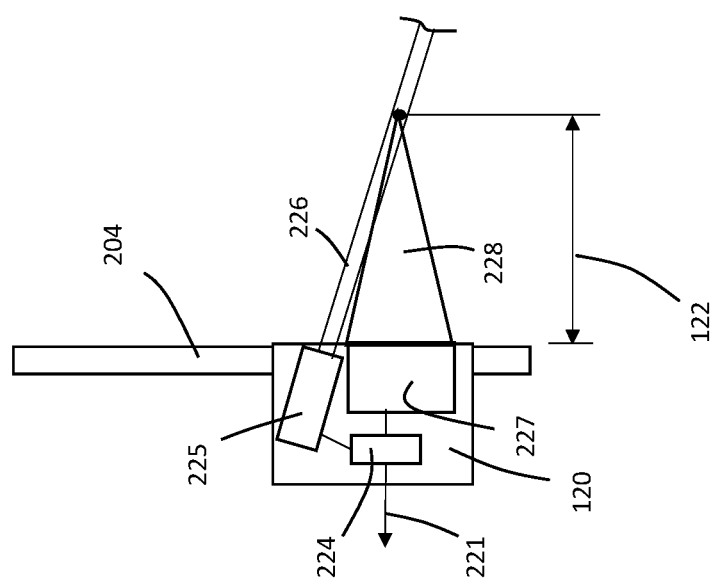
FIG. 2A illustrates a block diagram of a particle detector and an associated focal length according to one exemplary embodiment.
Figure 2B:
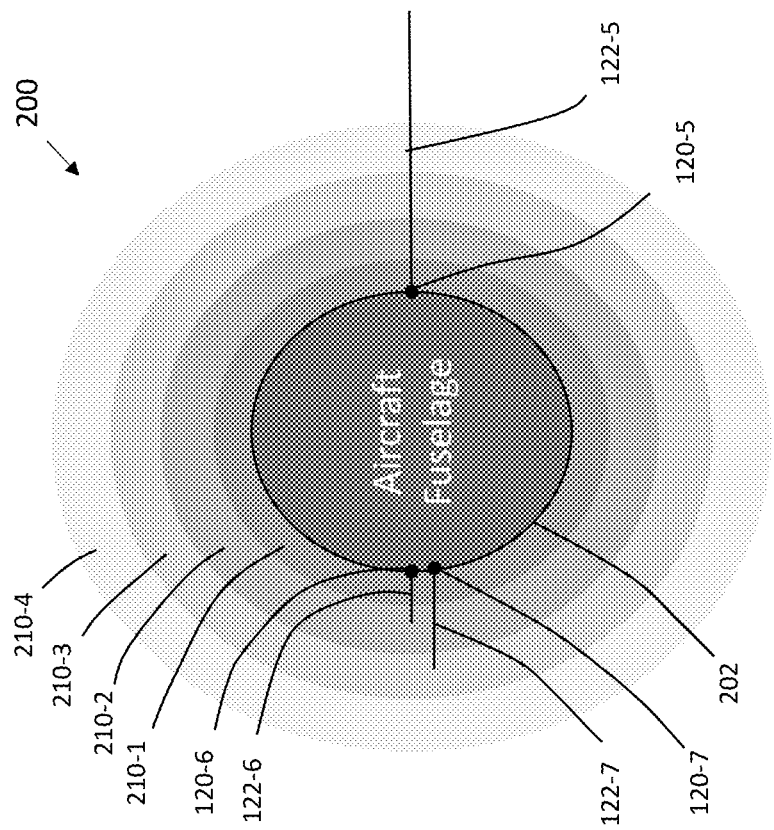
FIG. 2B illustrates a free stream comparison application layout of a configuration of particle sensors according to one exemplary embodiment.

Referring to FIG. 2A, a block diagram of a particle detector 120 and an associated focal length 122 is provided for illustrative purposes. The particle detector 120 example of FIG. 2B is illustrated as including a sensor controller 224, such as a processor or the like, that controls operation of a laser 225 and generates a particle sensor signal 221 based on an output from an optical system 227. The partial sensor signal 221 is provided to controller 104 of the system 100. In operation, the laser 225 generates laser light 226 that is directed out from the particle sensor 120 into particles away from the vehicle 102, such as particles away from a skin 204 of an aircraft. The particles reflect some of the laser light back towards the particle sensor. The focal length 122 of the receive optics in the optic system 227 allows for only reflected light back, that is within the cone of light 228, to be collected by the receive optics in the optic system 227. Hence, the focal length 122 of the receive optics in the optic system 227 is selected to monitor particles at a select distance from the particle sensor 120 or a surface of a vehicle 102.

The use of at least two particle detectors 120 at different locations in relation to the vehicle 102 provides air data parameters based on relative sensor measurements that can be used to determine a current vehicle operating state. Each detector 120 may measure the particle content in a sample volume at a finite distance from a surface of a vehicle 102, such as a fuselage of an aircraft in an avionic example, where at least one sample volume used by at least one particle detector 120 was taken in an airflow region that was disturbed by the aircraft 102. The movement of the aircraft 102 through the atmosphere disturbs the surrounding environment, including the velocity and concentration of particles in the atmosphere. The magnitude of this disturbance is dependent on many flight parameters. Examples of such flight parameters are air speed, air density, angle of attack and side slip angle.

Some, embodiments take advantage of disturbances by positioning 2 or more particle detectors 120 at various locations on the aircraft fuselage and matching the sensor measurements against a calibration covering the flight envelope of the aircraft. The calibration may be derived from modeling (e.g. computational fluid dynamics), direct measurement during flight test with adequate reference sensors, and/or tests in a wind tunnel.

Referring to FIG. 2B, illustrates an aircraft fuselage with disturbance areas 200. Further, FIG. 2B illustrates a free stream comparison application layout of a configuration of particle sensors 120 in an aircraft example. The aircraft fuselage with disturbance areas 200 includes an aircraft fuselage 202 with attached particle detectors 120-5, 120-6 and 120-7. Focal lengths 122-5, 122-6 and 122-7 associated with particle detectors 120-5, 120-6 and 120-7 are also illustrated. In this example, particle detectors 120-6 is opposably positioned on the aircraft fuselage 202 in relation to particle detectors 120-5. Further illustrated are the disturbance areas 210-1, 210-2, 210-3, and 210-4 with particle concentration gradients found around the aircraft fuselage 202. Each particle concentration gradient in the disturbance areas 210-1, 210-2, 210-3 and 210-4 represents levels of particle disturbance as the result of the movement of aircraft fuselage 202 through the particles. In the example of FIG. 2A the aircraft fuselage 202 and hence the aircraft it is associated with is generally traveling in a straight path.

In this example, particle detector 102-5, via its focal length 122-5, measures particles in a sample volume that is outside the disturbance areas while particle detector 102-6, via its focal length 122-6, measures particles in a sample volume that is within disturbance area 210-2. All parameters measured by particle detector 120-6 may be normalized by respective free stream values measured by sensor detector 120-5 thereby removing a variation due to total particle load. This normalized data can then be matched to the best fit flight conditions from the calibration. To further improve the fit, additional particle sensors can be added which either sample volumes at different distances from the fuselage 202, different locations on the fuselage 202, or both. For example, additional particle sensor, such as particle detector 120-7 in FIG. 2B samples at the same location as particle detector 120-6, but at a different distance from the aircraft fuselage 202 via focal length 122-7. FIG. 2C illustrates a particle concentration verses distance from fuselage graph 230. Graph 230 illustrates an example that uses a particle concentration parameter. Distances from the fuselage 202 are indicated by particle detectors 120-5, 120-6 and 120-7 in graph 230.

Figure 3B:
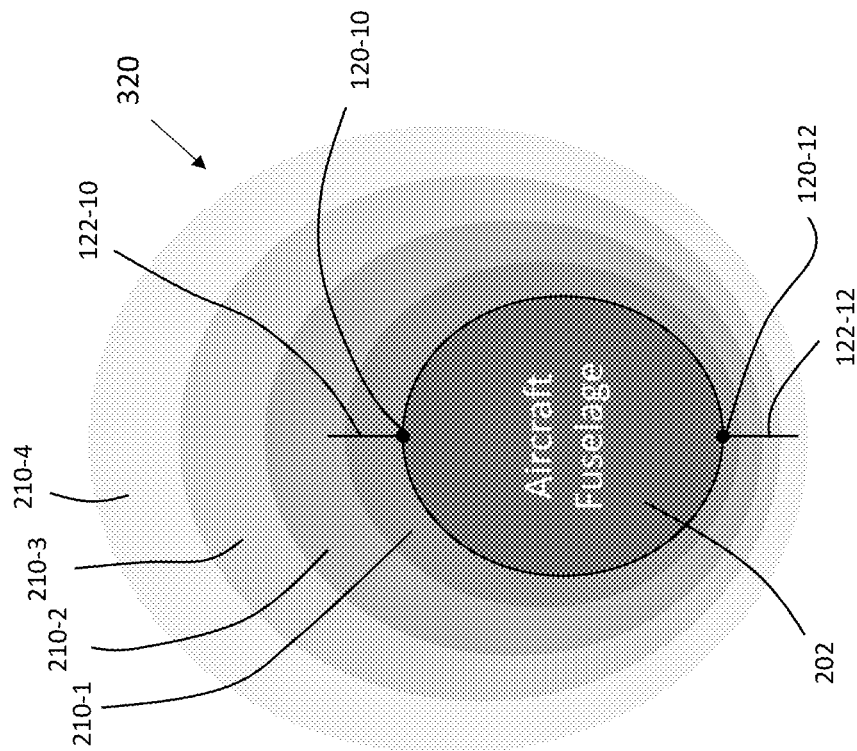
FIG. 3B illustrates an angle of attack configuration according to one exemplary embodiment.
Figure 3A:
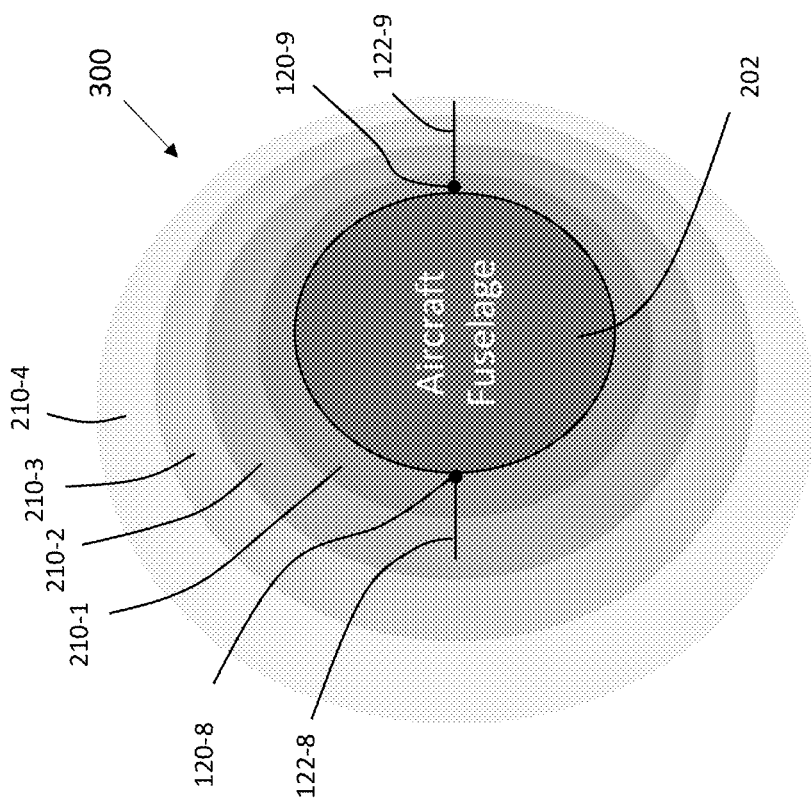
FIG. 3A illustrates a slide slip angle determination configuration according to one exemplary embodiment.

In another example embodiment, particle detectors 120-8 and 120-9 with nominally identical focal lengths 122-8 and 122-9 may be placed at identical locations on opposite sides of a waterline of the aircraft fuselage 202 in a slide slip angle determination configuration 300 as illustrated in FIG. 3A. The slide slip angle determination configuration 300 is meant to isolate changes due to a side slip angle (SSA). In flight conditions with 0 deg of side slip, the measurements from the two sensors should be nominally identical, different only by measurement errors. As side slip is introduced into the system, the gradients of deviations, disturbance areas 210-1, 210-2, 210-3, and 210-4, from free stream behavior should tilt to one side, inducing a differential measurement between the two sensors 120-8 and 120-9. As illustrated in FIG. 3A, particle detector 120-9 measures particle parameters in disturbance area 210-4 which are closer to free stream values, while particle detector 120-8 measures area 210-2 of greater disturbance.

A similar concept is depicted in an angle of attack configuration 320 illustrated in FIG. 3B. In the angle of attack configuration 320, particle detectors 120-10 and 120-12 with nominally identical focal lengths 122-10 and 122-12 may be placed at identically opposite locations of the top and bottom of the aircraft fuselage 202 in order to measure angle of attack of the aircraft. As illustrated, in this example, the aircraft fuselage 202 is angled so that particle detector 120-12 is measuring particles in a disturbance area 210-4 which is closer to a free stream value, while particle detector 120-10 is measuring in a disturbance area 210-2 that has greater disturbance caused by the aircraft fuselage 202. Other arrangements of particle detectors 120, locations and distance for taking a sample volume in relation to a vehicle, may be used. Further, although the above examples illustrate an application to an aircraft, other types of vehicles, including vehicles that traverse through water or on terrain may use this system.

Examples of how the controller 104 may use information from the particle detectors 120 in determining a then current vehicle operating state or improve operating state determinations from other sensors includes, but is not limited, measuring a size distribution of the particles. A solution can be found measuring the size distribution using bins where each size bin is used as an independent measurement, constraining the solution. In another example, measurements as a function of distance from the aircraft (as in a LiDAR echo measurement) may be used. A solution with this example can be found using each range bin as an independent measurement, constraining the solution. In yet another example, measurement of particle velocity may be used. The particle velocity in this example can be used as a further constraint. Further a measurement location may be used. The location of the measurement may be optimized for the measurement and the determination of specific air data parameters of interest is used within the measurement. For example, the slide slip angle configuration 300 of FIG. 3A and the angle of attack configuration 320 of FIG. 3B may be used together for optimum measurement of angle of attack and slide slip angle. Also, an inclusion of limited input data regarding flight parameters of the aircraft may be used. For example, to focus on angle of attack and side slip, static pressure, temperature and/or air speed may be used to limit the number of variables to solve for. In general, as the solution may not be found by analytical expressions, but by matching against a multi-dimensional space of possible solutions. Having more measurement parameters as compared to outputs is essential to obtaining a reliable solution.

Although FIGS. 2A, 3A and 3B, illustrates the focal lengths 122, being spaced select distances from the aircraft fuselage 202, one or more of the detectors 120 and associated focal lengths 122 may be configured to detect particles at the surface of the aircraft fuselage 202 in other example embodiments.

Referring to FIG. 4, a vehicle operating state particle detection system flow diagram 400 of one example embodiment is provided. The flow diagram 400 is illustrated as a series of sequential blocks. The sequence may occur in different order or may even occur in parallel in other embodiments. Hence embodiments are not limited to the sequential order illustrated in FIG. 4.

The process starts at block (402) obtaining a first sample volume of particles at a first location and at block (404) obtaining a second sample volume of particle at a second location. As discussed above, the first and second locations are distanced from each other about the vehicle. The particles collected in the first sample volume and the particles collected in the second sample volume are compared at block (406). As discussed above, if one of the sample volumes is taken in environment that is disturbed by the vehicle 102 (disturbance area 210) and the other sample volume is not or is taking from an environment that is less disturbed by the vehicle, a difference between a measurement of the particles will be present. Examples of parameters used in determining differences may include differences in the measurement of a particle size distribution, differences in the measurement of particle concentration as a function of distance from the vehicle and the measurement of particle velocity.

A difference in the particles in the different sample volumes is determined at block (408). A solution to operating state of the vehicle based on the difference is determined at block (410). It is noted that a difference does not need to be detected in determining an operating state of a vehicle. For example, no difference between the particle determined at block (408) may mean the slip angle of the vehicle is zero. The solution may then be used at block (412) to augment or verify a solution of the current operating state of the vehicle from other sensors. The process then continues at blocks (402) and (404) gathering sample volumes.

EXAMPLE EMBODIMENTS

Example 1 is system for determining a vehicle operating state. The system includes at least two particle detectors, a controller and a memory. A sample volume used by each particle detector of the at least two particle detectors configured to be collected in a different location relative to the vehicle than another sample volume used by another particle detector of the at least two particle detectors. Wherein at least one sample volume is configured to be collected in an environment where particles being detected by an associated particle detector are disturbed by the vehicle when the vehicle is in motion. The controller is in communication with the at least two particle detectors. The controller is configured to determine at least one operating state of the vehicle based at least in part on a comparison of output signals of the at least two particle detectors. The at least one memory is used to store at least operating instructions implemented by the controller in determining the at least one operating state of the vehicle.

Example 2 includes the system of Example 1, wherein the determined operating state is at least one of angle of attack, side slip angle and air speed.

Example 3 includes the system of any of the Examples 1-2, wherein the controller is configured to use at least one of measurement of a particle size distribution, measurement of particle concentration as a function of distance from the vehicle and measurement of particle velocity in determining the at least one state of the vehicle.

Example 4 includes the system of any of the Examples 1-3, wherein the controller is further configured to also use flight parameter data of the vehicle in determining the at least one state of the vehicle.

Example 5 includes the system of Example 4, wherein the flight parameter data includes at least one of static pressure, temperature and air speed.

Example 6 includes the system of any of the Examples 1-5, wherein each particle detector is configured to collect an associated sample volume at a select distance from a vehicle surface of the vehicle.

Example 7 includes the system of any of the Examples 1-6, wherein the at least two particle detectors further includes a first particle detector and a second particle detector. The system further includes a first particle detector positioned at a first side of an aircraft fuselage of the vehicle along a water line of the fuselage and a second particle detector positioned at a second side of the aircraft fuselage along the waterline of the fuselage. The first and second particle detectors positioned to determine side slip.

Example 8 includes the system of any of the Examples 1-7, wherein the at least two particle detectors further includes a first particle detector and a second particle detector. The system further including a first particle detector positioned on top of an aircraft fuselage of the vehicle and a second particle detector positioned at in an opposite fashion to the first particle on a bottom of the aircraft fuselage. The first and second particle detectors positioned to determine angle of attack.

Example 9 includes the system of any of the Examples 1-8, wherein the at least two particle detectors further includes a first particle detector configured to detect particles in a first sample volume taken within a disturbance area and a second particle detector configured to detect particles in a second sample volume taken outside the disturbance area.

Example 10 includes system for determining a vehicle operating state. The system includes a plurality of particle detectors, at least one controller, and at least one memory. A sample volume used by one of the particle detectors of the plurality of particle detectors is collected at a distance from a surface of the vehicle that is greater than at least one other collected sampled volume used by another particle detector of the plurality of particle detectors. The at least one controller is in communication with the plurality of particle detectors. The controller is configured to determine at least one operating state of the vehicle based at least in part on a comparison of output signals of at least two particle detectors of the plurality of particle detectors. The at least one memory is used to store at least operating instructions implemented by the controller in determining the at least one operating state of the vehicle.

Example 11 includes the system of claim 10, wherein a sample volume used by at least one particle detector of the plurality of particle detectors is collected in a different location relative to the vehicle than another sample volume used by another particle detector of the plurality of particle detectors.

Example 12 includes the system of any of the Examples 10-11, wherein the plurality of particle detectors further includes a first particle detector configured to detect particles in a first sample volume taken within a disturbance area and a second particle detector configured to detect particles in a second sample volume taken outside the disturbance area.

Example 13 includes the system of any of the Examples 10-12, wherein the determined operating state is at least one of angle of attack, side slip angle and air speed.

Example 14 includes the system of any of the Examples 10-13, wherein the at least one controller is configured to use at least one of measurement of a particle size distribution, measurement of particle concentration as a function of distance from the vehicle and measurement of particle velocity in determining the at least one state of the vehicle.

Example 15 includes the system of any of the Examples 10-14, wherein the at least one controller is further configured to also use flight parameter data of the vehicle from other sensors in determining the at least one state of the vehicle, the flight parameter data including at least one of static pressure, temperature and air speed.

Example 16 includes a method of operating a system for determining an operating state using particle detection. The method includes obtaining at least a first sample volume of particles and a second sample volume of particles, wherein the first sample volume is collected in an environment where particles being detected by a particle detector are disturbed by the vehicle by a change in operating state of the vehicle and the second sample volume is collected in an environment where the particles in the second sample volume being detected will be disturbed in a different manner than the particles in the first sample volume by the change in operating state of the vehicle; comparing particles in the at least first sample volume and the second sampled volume; and determining at least one operating state of the vehicle based on the comparison.

Example 17 includes the method of Example 16, further including augmenting at least one operating state of the vehicle determined by a sensor system based on the determined at least one operating state of the vehicle.

Example 18 includes the method of any of the Examples 16-17, wherein the first and second sample volumes are collected at one of different locations in relation to the vehicle and at different distances from a vehicle surface.

Example 19 includes the method of any of the Examples 16-18, wherein comparing particles in the first and second sample volumes includes at least one of a measurement of a particle size distribution, measurement of particle concentration as a function of distance from the vehicle and measurement of particle velocity in determining the at least one state of the vehicle.

Example 20 includes the method of any of the Examples 16-19, wherein the determined operating state of the vehicle is one of angle of attack, side slip angle and air speed.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A system for determining a vehicle operating state, the system comprising:
   at least two particle detectors, a sample volume used by each particle detector of the at least two particle detectors configured to be collected in a different location relative to the vehicle than another sample volume used by another particle detector of the at least two particle detectors, wherein at least one sample volume is configured to be collected in an environment where particles being detected by an associated particle detector are disturbed by the vehicle when the vehicle is in motion;
   a controller in communication with the at least two particle detectors, the controller configured to determine at least one current operating state of the vehicle based at least in part on a comparison of current output signals of the at least two particle detectors, further wherein the controller is configured to use at least one of a measurement of a particle size distribution and a measurement of particle concentration as a function of distance from the vehicle in determining the at least one current operating state of the vehicle, the controller configured to augment at least one operating state of the vehicle determined by a sensor system based on the determined at least one current operating state of the vehicle; and
   at least one memory to store at least operating instructions implemented by the controller in determining the at least one operating state of the vehicle.

2. The system of claim 1, wherein the determined operating state is at least one of angle of attack, side slip angle and air speed.

3. The system of claim 1, wherein the controller is configured to use a measurement of particle velocity in determining the at least one state of the vehicle.

4. The system of claim 1, wherein the controller is further configured to also use flight parameter data of the vehicle in determining the at least one state of the vehicle.

5. The system of claim 4, wherein the flight parameter data includes at least one of static pressure, temperature and air speed.

6. The system of claim 1, wherein each particle detector is configured to collect an associated sample volume at a select distance from a vehicle surface of the vehicle.

7. The system of claim 1, wherein the at least two particle detectors further includes a first particle detector and a second particle detector, the system further comprising:
   the first particle detector positioned at a first side of an aircraft fuselage of the vehicle along a waterline of the fuselage; and
   the second particle detector positioned at a second side of the aircraft fuselage along the waterline of the fuselage, the first and second particle detectors positioned to determine side slip.

8. The system of claim 1, wherein the at least two particle detectors further include a first particle detector and a second particle detector, the system further comprising:
   the first particle detector positioned on top of an aircraft fuselage of the vehicle; and
   the second particle detector positioned in an opposite fashion to the first particle detector on a bottom of the aircraft fuselage, the first and second particle detectors positioned to determine angle of attack.

9. The system of claim 1, wherein the at least two particle detectors further comprise:
   a first particle detector configured to detect particles in a first sample volume taken within a disturbance area; and
   a second particle detector configured to detect particles in a second sample volume taken outside the disturbance area.

10. A system for determining an operating state using particle detection, the system comprising:
    a plurality of particle detectors, a sample volume used by one of the particle detectors of the plurality of particle detectors being collected at a distance from a surface of the vehicle that is greater than at least one other collected sampled volume used by another particle detector of the plurality of particle detectors;
    at least one controller in communication with the plurality of particle detectors, the at least one controller configured to determine at least one current operating state of the vehicle based at least in part on a comparison of current output signals of at least two particle detectors of the plurality of particle detectors, wherein the at least one controller is configured to use at least one of a measurement of a particle size distribution and a measurement of particle concentration as a function of distance from the vehicle in determining the at least one operating state of the vehicle;
    at least one memory to store at least operating instructions implemented by the controller in determining the at least one current operating state of the vehicle; and
    a vehicle operating control system configured to control operations of the vehicle based at least in part on the determination of the at least one current operating state of the vehicle by the controller.

11. The system of claim 10, wherein a sample volume used by at least one particle detector of the plurality of particle detectors is collected in a different location relative to the vehicle than another sample volume used by another particle detector of the plurality of particle detectors.

12. The system of claim 10, wherein the plurality of particle detectors further comprise:
    a first particle detector configured to detect particles in a first sample volume taken within a disturbance area; and a second particle detector configured to detect particles in a second sample volume taken outside the disturbance area.

13. The system of claim 10, wherein the determined operating state is at least one of angle of attack, side slip angle and air speed.

14. The system of claim 10, wherein the at least one controller is configured to use a measurement of particle velocity in determining the at least one state of the vehicle.

15. The system of claim 10, wherein the at least one controller is further configured to also use flight parameter data of the vehicle from other sensors in determining the at least one state of the vehicle, the flight parameter data including at least one of static pressure, temperature and air speed.

16. A method of operating a system for determining an operating state using particle detection, the method comprising:
  obtaining at least a current first sample volume of particles with a first particle detector and a current second sample volume of particles with a second particle detector, wherein the first sample volume is collected in an environment where particles being detected by the first particle detector are disturbed by the vehicle by a change in operating state of the vehicle and the second sample volume is collected by the second particle detector in an environment where the particles in the second sample volume being detected will be disturbed in a different manner than the particles in the first sample volume by the change in operating state of the vehicle;
  comparing particles in the at least first sample volume and the second sampled volume with a controller, wherein the comparing particles in the first and second sample volumes with the controller includes at least one of comparing a measurement of a particle size distribution and a measurement of particle concentration as a function of distance from the vehicle;
  determining at least one current operating state of the vehicle based on the comparison; and
  augmenting at least one operating state of the vehicle determined by a sensor system based on the determined at least one current operating state of the vehicle.

17. The method of claim 16, further comprising:
  controlling the vehicle with a vehicle operating control system based at least in part on the determined at least one current operating state of the vehicle.

18. The method of claim 16, wherein the first and second sample volumes are collected at one of different locations in relation to the vehicle and at different distances from a vehicle surface.

19. The method of claim 16, wherein comparing particles in the first and second sample volumes includes a measurement of particle velocity in determining the at least one state of the vehicle.

20. The method of claim 16, wherein the determined operating state of the vehicle is one of angle of attack, side slip angle and air speed.

* * * * *